No. 709,875. Patented Sept. 30, 1902.
R. COMMICHAU.
HEATING OR COOLING PIPE.
(Application filed May 5, 1902.)
(No Model.) 2 Sheets—Sheet 1.

Witnesses.

Inventor:
Rudolf Commichau

No. 709,875. Patented Sept. 30, 1902.
R. COMMICHAU.
HEATING OR COOLING PIPE.
(Application filed May 5, 1902.)

(No Model.) 2 Sheets—Sheet 2.

Witnesses. Inventor.

UNITED STATES PATENT OFFICE.

RUDOLF COMMICHAU, OF MAGDEBURG-SUDENBERG, GERMANY.

HEATING OR COOLING PIPE.

SPECIFICATION forming part of Letters Patent No. 709,875, dated September 30, 1902.

Application filed May 5, 1902. Serial No. 106,044. (No model.)

*To all whom it may concern:*

Be it known that I, RUDOLF COMMICHAU, a subject of the Emperor of Germany, residing at Magdeburg-Sudenberg, in the German Empire, have invented new and useful Improvements in Heating or Cooling Pipes, of which the following is a specification.

This invention relates to improvements in the manufacture of heating or cooling pipes.

According to the invention in order to obtain a large heating or cooling surface and high rigidity, together with small weight, I make use of straight metal strips bent in a fan-like, zigzag, or corrugated manner and provided with holes through which pass pipes conveying the cooling or warming medium, the said pipes being subsequently by zincing, galvanizing, soldering, or in any other suitable manner secured to the ribs or gills so formed. This arrangement of the ribs or gills or folds on the heating or cooling pipes in addition to its extreme simplicity possesses the advantage that pipes of any desired length can be provided without waste of material, and since the individual gills or ribs mutually support one another a very secure fastening is obtained independently of any necessary metallic connection of the pipes with the ribs or gills which may be effected, for example, by zincing, soldering or galvanically or in any other suitable manner.

Figure 1:
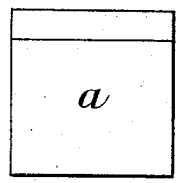
Figure 2:
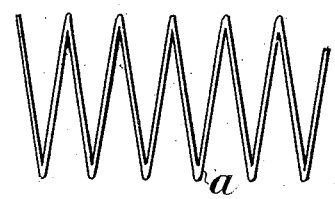
Figure 3:
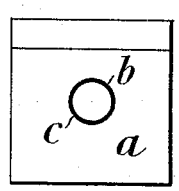
Figure 4:
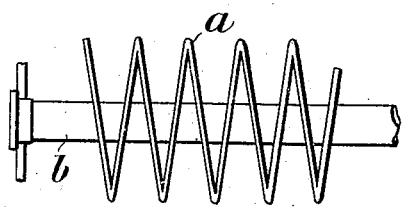
Figure 5:
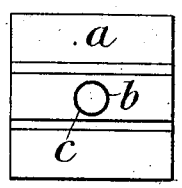
Figure 6:
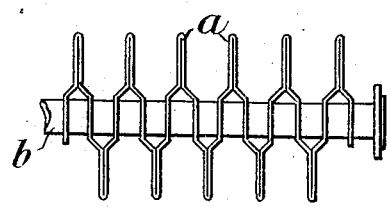
Figure 7:
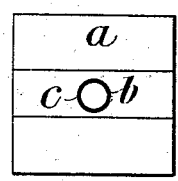
Figure 8:
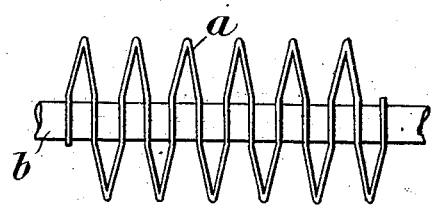
Figure 10:
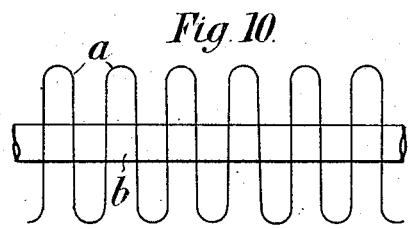
Figure 9:
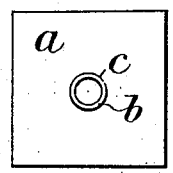
Figure 11:
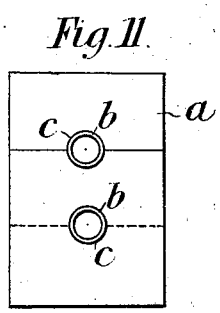
Figure 12:
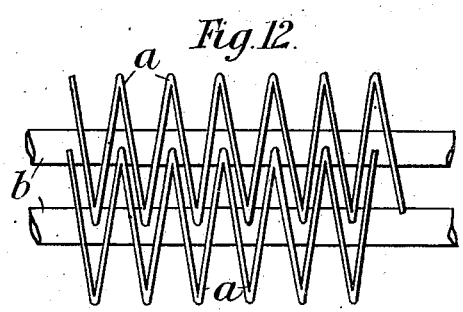
Figure 13:
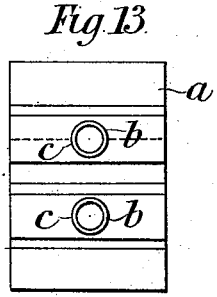
Figure 14:
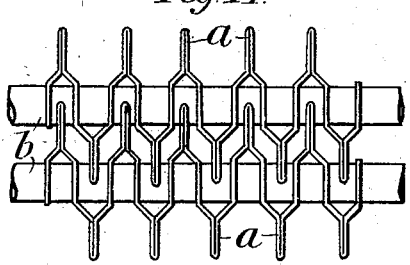
Figure 15:
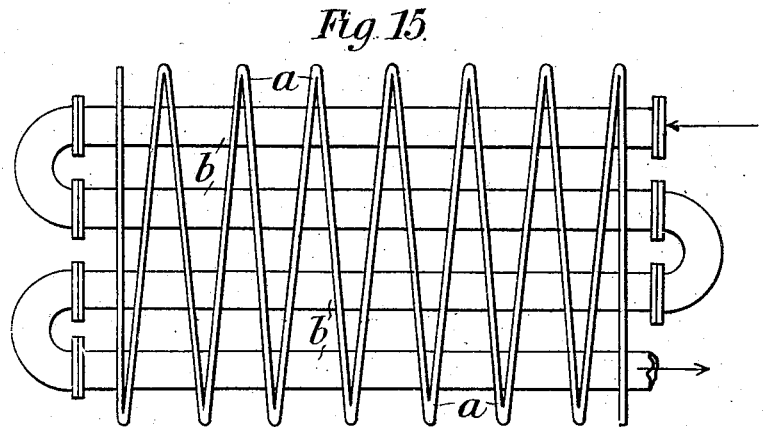

In the accompanying drawings, Figures 1 and 2 are an end and side view, respectively, of a zigzag metal plate. Figs. 3 and 4 are similar views of a plate provided with a pipe. Figs. 5 and 6, 7 and 8, and 9 and 10 are views similar to Figs. 3 and 4, respectively, of three modifications. Figs. 11 and 12 are an end view and side view, respectively, showing two zigzag plates and two pipes connected. Figs. 13 and 14 are similar views to Figs. 11 and 12, showing another form of plates; and Fig. 15 is a side view of a zigzag plate having connected thereto a series of pipes.

$a$ is the metal plate which is bent to any suitable shape—for instance, any one of the forms given in the different figures as examples—and $b\ b$ are the pipes through which flows the heating or cooling medium and which are passed through holes $c\ c$, formed in the metal plate.

Figs. 12 and 14 illustrate one manner in which the heating or cooling pipes $b\ b$ can be rigidly connected together, this arrangement being specially adapted for cases where large heating or cooling surfaces are required with small weight—as, for example, in the case of motor-vehicles.

The separate bends can be made so large that each surface can be provided with several pipes and holes to receive them, so as to obtain in this manner complete heating or cooling systems.

In the arrangement shown in Fig. 15 I have illustrated a zigzag metal plate provided with four perforations, through which are passed pipes, forming a complete heating or cooling system.

The forms of the metal plate shown are only given as examples, as the said plates can be made in any other suitable form—for example, corrugated, &c.—so long as they allow of the described connection between the different surfaces.

Having now particularly described and ascertained the nature of my said invention and in what manner the same is to be performed, I declare that what I claim is—

1. The combination with a pipe for conveying a heating or cooling medium, of an integral radiating-plate bent or folded in a zigzag manner and having each of its folds provided with an aperture through which said pipe extends, substantially as described.

2. The combination with a pipe for conveying a heating or cooling medium, of an integral radiating-plate bent or folded in a zigzag manner and having each of its folds provided with an aperture through which said pipe extends, the said folds of said radiating-plates being rigidly connected with said pipe by metallic connection, substantially as described.

3. The combination with a plurality of pipes for conducting a heating or cooling medium, of a radiating-plate bent or folded in a zigzag manner, each of the folds of said plate being provided with an aperture for each of said pipes, and each of said pipes extending through all the folds of said plate, substantially as described.

RUDOLF COMMICHAU.

Witnesses:
OTTO STORES,
GEORG BECKER.